UNITED STATES PATENT OFFICE.

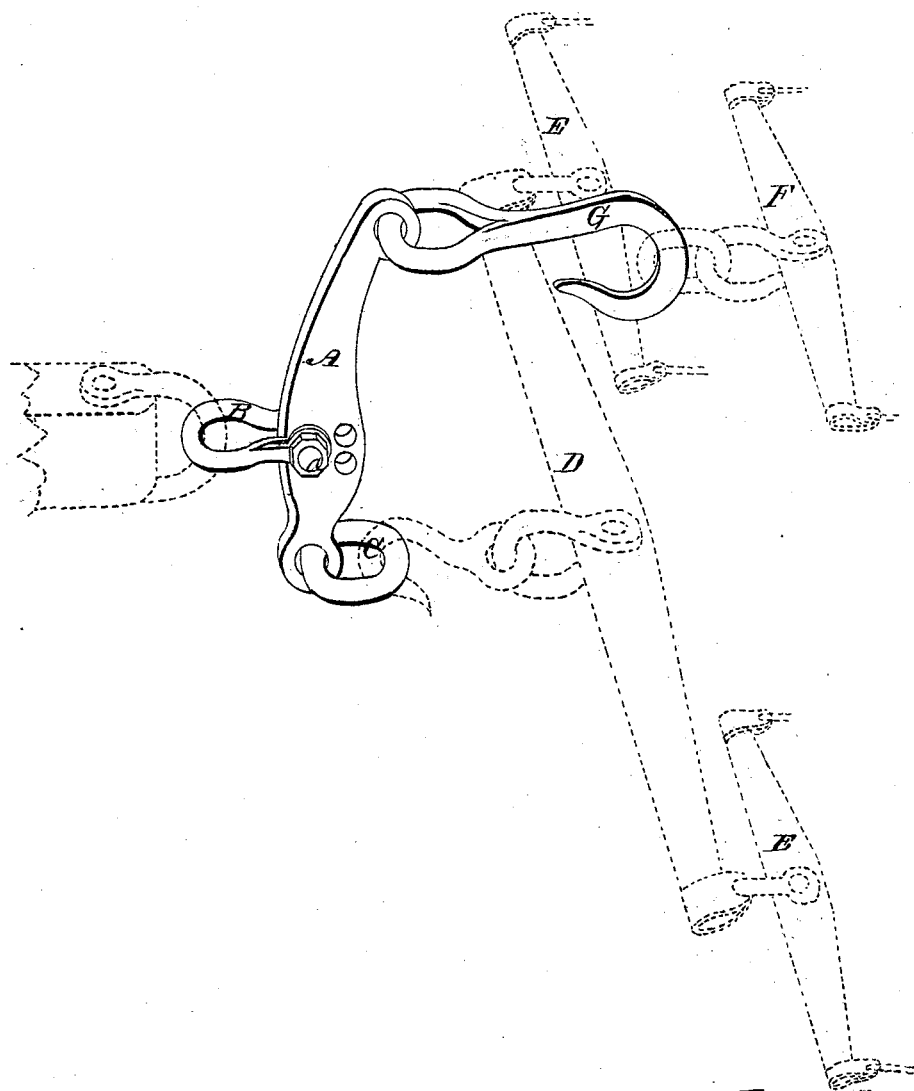

HARRISON W. AUSTIN AND WILLIAM SCHAW, OF KALAMAZOO, MICHIGAN.

IMPROVEMENT IN PLOUGH-CLEVIS.

Specification forming part of Letters Patent No. 68,545, dated September 3, 1867.

*To all whom it may concern:*

Be it known that we, HARRISON W. AUSTIN and WILLIAM SCHAW, of Kalamazoo, in the county of Kalamazoo and State of Michigan, have invented a new and Improved Clevis; and we do hereby declare that the following is a full, clear, and exact description thereof, which will enable others skilled in the art to make and use the same, reference being had to the accompanying drawing, and to the letters of reference marked thereon.

This invention relates to a new and improved clevis for ploughs and other agricultural implements. The object of the invention is to obtain a clevis which will admit of three horses abreast, or side by side, being attached to the implement in such a manner that the draft will be equally divided among the three.

The accompanying drawing represents a perspective view of our invention.

A represents a metal bar, which has a link or eye, B, attached to it by a pivot-bolt, $a$, near one end, or at a considerable distance from its center. This link or eye B is fitted in the ordinary clevis-loop at the front end of the beam of the plough, (in a vertical position,) or other implement, which is shown in red in the drawing, the link or eye being attached to the bar A in such a manner that the latter will have a vertical position. In the lower end of the bar A there is fitted a ring, C, to which an ordinary double-tree, D, is attached, which ring C receives the hook of the double-tree D, having a whiffletree, E, at each end, as shown in red, and to the upper end of the vertical bar A a whiffletree, F, is attached by a hook, G, which is considerably longer than the ring C in order that the whiffletree F may be in advance of the whiffletrees E of the double-tree D, said whiffletree F being in the center of the whiffletrees E, so that its draft shall be exactly in the center, and on a line with the plough-beam.

By this simple means it will be seen that three horses abreast, or side by side, may be attached to the plow or other implement in such a manner that the draft will be equalized between the three animals, the vertical bar A serving as an equalizer, as the animal attached to the upper whiffletree F has an increased leverage over the two animals attached to the lower end of the vertical bar A, fully enough to compensate for the increased power of two animals over one, and the disadvantage of the position attending the center horse.

Having thus described our invention, we claim as new, and desire to secure by Letters Patent—

The construction and arrangement of the vertical bar A, double tree D, single-trees E E and F, as herein described, for the purpose specified.

The above specification of our invention signed by us this 13th day of July, 1867.

HARRISON W. AUSTIN.
    WILLIAM SCHAW.

Witnesses:
 G. P. DOWN,
 F. A. BOOHER.